United States Patent
Mossler

(10) Patent No.: US 7,201,081 B2
(45) Date of Patent: Apr. 10, 2007

(54) BOWDEN CABLE WITH A CURVED GUIDE PART

(75) Inventor: Joerg Mossler, Poernbach (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 11/017,964

(22) Filed: Dec. 22, 2004

(65) Prior Publication Data

US 2005/0166701 A1    Aug. 4, 2005

Related U.S. Application Data

(63) Continuation of application No. PCT/EP03/06198, filed on Jun. 12, 2003.

(30) Foreign Application Priority Data

Jun. 22, 2002   (DE)   ................ 102 27 873

(51) Int. Cl.
*F16C 1/10*   (2006.01)

(52) U.S. Cl. ............... 74/502.4; 74/501.5 R; 74/500.5; 74/502.6

(58) Field of Classification Search ............... 74/502.4, 74/502.6, 502.3, 501.6, 500.5, 501.5 R; 464/52; 403/165, 24; F16C 1/10
See application file for complete search history.

(56) References Cited

U.S. PATENT DOCUMENTS

| | | | |
|---|---|---|---|
| 3,444,701 A * | 5/1969 | Randolph | ................ 464/52 |
| 4,007,647 A * | 2/1977 | Carlson | ................ 74/502.4 |
| 4,023,435 A | 5/1977 | LaDue | |
| 4,090,329 A | 5/1978 | Rampel | |
| 4,294,133 A | 10/1981 | Hurley | |
| 4,515,035 A | 5/1985 | Kuester | |
| 4,790,205 A * | 12/1988 | Stocker | ................ 74/500.5 |
| 4,889,005 A * | 12/1989 | Crack | ................ 74/501.6 |
| 5,003,837 A | 4/1991 | Italiano | |
| 5,003,838 A * | 4/1991 | Pospisil et al. | ............ 74/502.4 |
| 5,678,456 A | 10/1997 | Webb | |
| 5,737,973 A * | 4/1998 | Reasoner | ................ 74/502.4 |
| 6,250,175 B1 * | 6/2001 | Noetzold | ................ 74/502.3 |

FOREIGN PATENT DOCUMENTS

| | | |
|---|---|---|
| AT | 391 525 B | 10/1986 |
| DE | G 94 00 555.9 | 1/1994 |
| EP | 0 899 470 A2 | 3/1999 |
| EP | 0 933 540 A1 | 8/1999 |
| GB | 2 195 161 A | 3/1988 |
| JP | 11280750 A | 10/1999 |
| JP | 2002089537 A | 3/2002 |

OTHER PUBLICATIONS

Merriam-Webster's Collegiate Dictionary, Tenth Edition, 1999, p. 591.*
International Search Report, Jun. 22, 2002.
German Search Report, Jun. 22, 2002.

* cited by examiner

*Primary Examiner*—Vinh T. Luong
(74) *Attorney, Agent, or Firm*—Crowell & Moring LLP

(57) ABSTRACT

Bowden cable is provided with an interchangeable curved guide part which is detachably connected to a fastening element. Due to the detachable fastening of the curved guide part to the fastening element, a modular design of the Bowden cable is achieved, necessitating only replacement and/or selection of a corresponding guide part or fastening element.

6 Claims, 1 Drawing Sheet

BOWDEN CABLE WITH A CURVED GUIDE PART

This application claims the priority of German application no. 102 27 873.3, filed Jun. 22, 2002, and PCT International Patent Application No. PCT/EP03/06198, filed Jun. 12, 2003, the disclosure of which is expressly incorporated by reference herein.

BACKGROUND AND SUMMARY OF THE INVENTION

This invention relates to a Bowden cable with a curved guide part which is detachably connected to a fastening element.

Such a Bowden cable according to German patent document 94 00 555.9 has a curved guide part connected in a form-fitting and therefore undetachable manner to the fastening element, which is designed as a connecting sleeve. The curved guide part is connected to the fastening element by a complex injection molding operation when the fastening element is manufactured from plastic. If cables or wires with a different cable diameter and/or radius of curvature of the guide part are necessary for other applications of the Bowden cable, then the guide part and the fastening element are to be replaced by other corresponding parts. Multiple fastening parts and guide parts must thus be manufactured and kept on hand accordingly for different applications of the Bowden cable.

The object of this invention is to provide a Bowden cable with a curve guide part which is detachable from a fastening element, such that it can be used for different applications with only minor modifications.

Due to the detachable fastening of the curved guide part to the fastening element, a modular design of the Bowden cable is achieved, necessitating only replacement and/or selection of a corresponding guide part or fastening element, which are preferably kept in stock. For example, a common fastening element may be provided for many or all applications to which only one curved guide part, which is adapted to the particular application case, is to be connected. The Bowden cable can be used in a variety of ways, e.g., between a door handle and a lock part of a motor vehicle door. If the design space is limited due to other components, the wire and a sheath surrounding the wire may be curved more or less greatly away from the other component over the curved guide part. If the other component is to be replaced by a larger or smaller component, then the Bowden cable may be used if, for example, the curved guide part is replaced by another guide part which is adapted to the particular component to be used. The detachable connection of the guide part to the fastening element may be designed in various ways, e.g., by a simple catch or lock mechanism.

Other objects, advantages and novel features of the present invention will become apparent from the following detailed description of the invention when considered in conjunction with the accompanying drawings.

DETAILED DESCRIPTION

Figure 1:
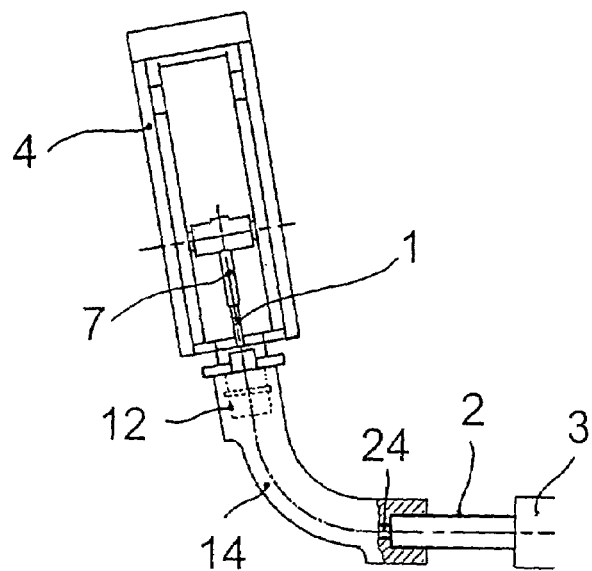
FIG. 1 shows a simplified view from one end of an installed Bowden cable in accordance with an embodiment of the present invention.

The Bowden cable illustrated in simplified terms in FIG. 1 transmits the swiveling movement of an inside handle on a vehicle door to an operating lever of a door lock, but the figure shows only the end area of the Bowden cable assigned to the inside handle. The Bowden cable has a wire 1, which is surrounded by a flexible wire sheathing 2. In at least some areas, the wire sheathing 2 is surrounded by noise insulation 3, which is intended to prevent hard and possibly noisy shearing of the wire sheathing 2 on the wall of the door when the inside handle is operated. The Bowden cable has a fastening element 4, which is shown on an enlarged scale in FIG. 2; it is manufactured in one piece as a plastic part that can be inserted into a receptacle opening in a handle shell which pivotably supports the inside handle and is detachably connected to the vehicle door. The fastening element 4 has two side walls 11 which are situated opposite one another laterally with a distance between them, with an arc-shaped guide 5 being designed in each, with a guide pin 6 being adjustably guided longitudinally in these guides. The guide pin 6 is connected to the wire end 7 of the wire 1 which is designed with reinforcement. After insertion of the fastening element 4 into the receptacle opening of the handle shell (not shown) into a use position, a projection 8 on the fastening element 4 engages behind a supporting socket on the handle shell, and a catch nose 9 on the fastening element 4 engages in a catch recess on the handle shell, with which the fastening element 4 is attached to the vehicle door. In the use position of the fastening element 4, a driving element on a lever arm of the door handle (not shown here) engages behind a middle area 10 of the guide pin 6, which is designed with a circular cross section and has a larger diameter than the lateral guide pin 6.

Figure 2:
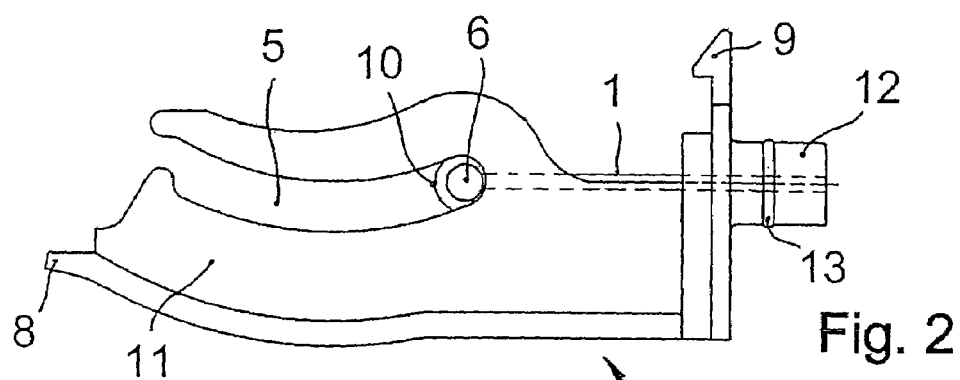
FIG. 2 shows an enlarged side view of the fastening element of the Bowden cable shown in FIG. 1.

The fastening element 4 has a protruding pipe socket 12, as illustrated in FIG. 2, with the wire 1 passing through it axially. In its axially central area, the pipe socket 12 has a radially protruding catch projection 13 running around the circumference of the pipe socket 12, forming a closed ring.

Figure 3:
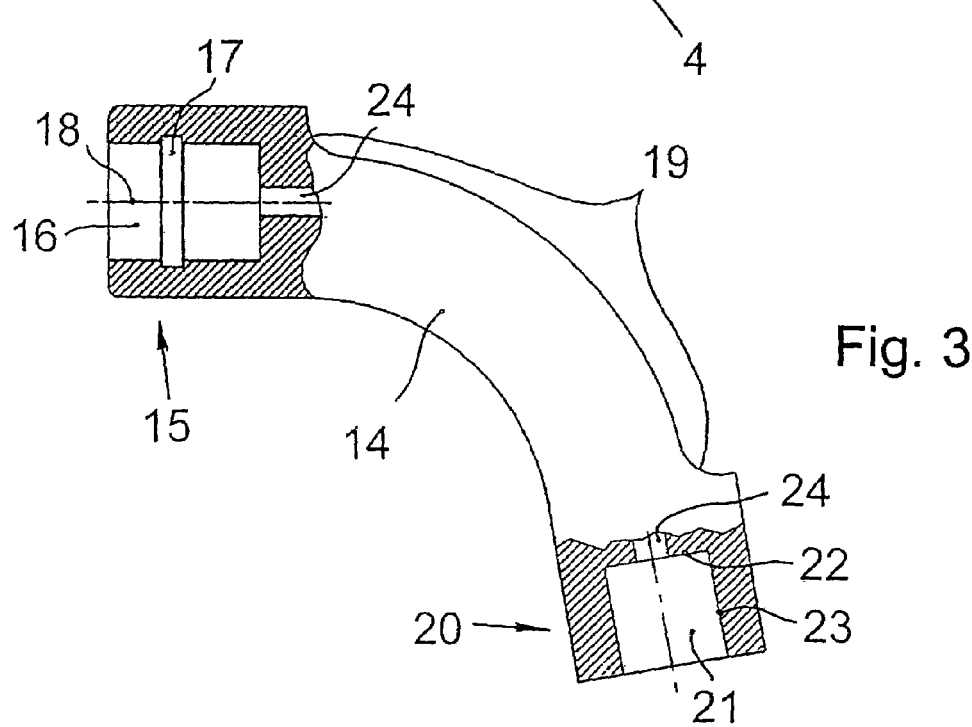
FIG. 3 shows an enlarged side view of the guide part of the Bowden cable shown in FIG. 1.

The guide part 4, which is shown in FIG. 3, enlarged in a side view where it is partially cut away, is to be detachably connected to the fastening element 4. To this end, the end area 15 of the guide part 14 facing the fastening element 4 has an axial cylindrical end opening 16 which has a slightly larger diameter than the outside diameter of the pipe socket 12 next to the catch projection 13. In the axially central area of the end opening 16, a ring-shaped radial recess 17 is formed with the catch projection 13 engaging radially in it when the guide part 14 with the end opening 16 is attached axially to the pipe socket 12 of the fastening element 4 until reaching a supporting position. In order to be able to place the guide part 14 on the pipe socket 12 of the fastening element 4, the end opening 16 and/or the catch projection 13 is designed to be radially elastic, so that the catch projection 13, which has a greater radial extent than the end opening 16 and thus also the pipe socket 12, can be inserted axially into the end opening 16 of the guide part 14 as far as the supporting position.

The guide part 14 and the fastening element 4 are detachably connected by the catch connection in the catch position. The parts can then be detached from one another through an appropriate axial force, in which case the end opening 16 and/or the catch projection 13 can be deformed elastically accordingly to allow the catch projection 13 on the pipe socket 12 to be released from the recess 17 in the end opening 16. In the catch position corresponding to FIG 1, the guide part 14 may execute a rotational movement about the center axis 18 of the end opening 16, in which case a supporting part that is optionally present in advance for supporting the wire sheathing 2 may have to be removed. The possibility of such a rotational movement may be utilized, for example, to allow the Bowden cable to be wasted on both right and left-side vehicle doors. In this case, the same fastening elements 4 and the same guide parts 14 may be used, but only the guide parts 14 are to be used in installed positions that differ by approximately 180 degrees. The central axis 18 of the end opening 16 in the guide part 14 runs coaxially with the wire 1, which then runs along the curved central axis of the guide part 14 in a cable guide 24 in the guide part 14. For manufacturing reasons, the cable guide 24 is designed to be open radially to the outside in the curvature area 19 of the guide part 14, which is on the outside radially. A receptacle opening 21 into which the facing end of the wire sheathing 2 is inserted axially is formed on the end area 20 of the guide part 14 facing away from the fastening element 4, whereby the wire sheathing 2 is supported axially on the bottom surface 22 of the receptacle opening 21. The cylindrical inside circumference 23 of the receptacle opening 21 supports a cylindrical circumferential area of the wire sheathing 2.

The guide part may be designed to be dimensionally stable or somewhat elastically yielding and to be detachably connected to the fastening element via any catch or locking device. A required radius of curvature of the cable and/or the strand of the Bowden cable can be induced by the guide part. The other end of the Bowden cable may be supported in a manner comparable to that in the exemplary embodiment or in some other way. The fastening element and the guide part may be made of different materials or the same materials, e.g., they may be made of plastic. The curved guide part is also understood to include a guide part which has a curved and/or angled area with respect to a connecting axis of the fastening element.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A Bowden cable with a curved guide part connected to a fastening element, wherein
the curved guide part is detachably connected to the fastening element by way of a releasable detent device,
the detent device having an axial cylindrical end opening in the end area of the guide part which has a diameter equal to or larger than an outside diameter of a cylindrical pipe socket projecting from the fastening element,
the cylindrical pipe socket is axially penetrated by a wire of the Bowden cable,
the pipe socket has in an axially middle area on its outer circumference a radially outwards protecting detent projection with an outer diameter larger than the axial cylindrical end opening arranged to fit into the axial cylindrical end opening of the guide part to a supporting position in which the detent projection on the pipe socket engages in at least one of force-lockingly and form-lockingly manner in a ring-shaped radial indentation in the axial cylindrical end opening of the guide part, wherein an outer-most radius of the ring-shaped radial indentation has a diameter larger than the diameter of the axial cylindrical end opening, and
at least one of the detent projection on the pipe socket of the fastening element and the axial cylindrical end opening in the guide part is radially elastic, such that when the detent projection on the pipe socket is axially inserted into the axial cylindrical end opening in the guide part, as a result of the elastic deformation of at least one of the detent projection on the pipe socket and the axial cylindrical end opening in the guide part, the detent projection engages the guide part at the supporting position.

2. The Bowden cable as claimed in claim 1, wherein the guide part is detachably connected to the fastening element such that the guide part can be rotated about an axis of rotation with respect to the fastening element.

3. The Bowden cable as claimed in claim 2, wherein the axis of rotation runs coaxially approximately with the central axis of the cable of the Bowden cable.

4. The Bowden cable as claimed in claim 1, wherein the Bowden cable has at least two interchangeable guide parts, the guide parts have at least one of different curvatures and different sized internal cable guide channels, and each of the interchangeable guide parts is configured to be detachably connected to the fastening element.

5. The Bowden cable as claimed in claim 1, wherein the cable of the Bowden cable is surrounded by a flexible wire sheathing which is supported axially on a supporting surface of the guide part.

6. The Bowden cable as claimed in claim 5, wherein a receptacle opening is formed on an end face of the guide part facing away from the fastening element, the wire sheathing is insertable axially into the receptacle opening until the wire sheathing is in contact with said supporting surface at a bottom of the receptacle opening, and the inside circumference of the receptacle opening radially supports a cylindrical peripheral area of the wire sheathing.

* * * * *